E. F. BROWN.
VEHICLE SPRING.
APPLICATION FILED SEPT. 26, 1908.
920,910.
Patented May 11, 1909.
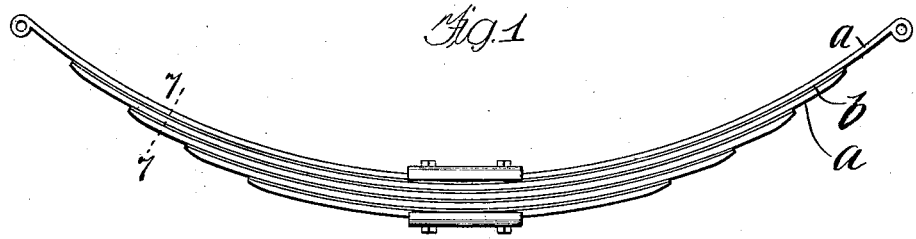
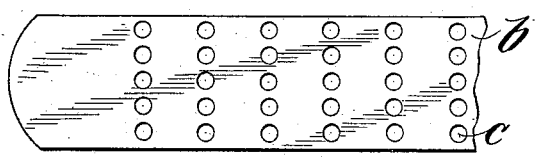
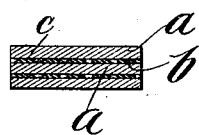
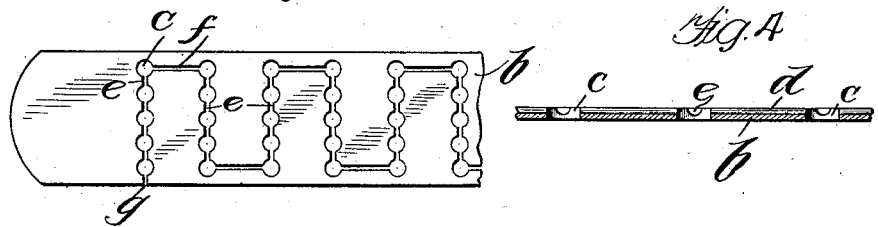
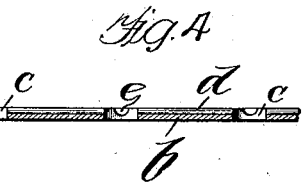
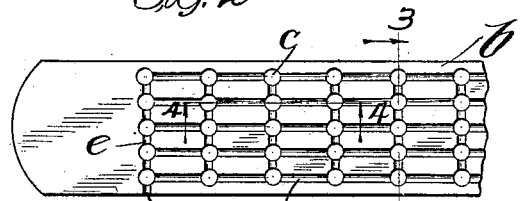
Witnesses:
Ira D. Perry
Robert H. Weir
Inventor:
Edwin F. Brown
By G. L. Cragg
Attorney

UNITED STATES PATENT OFFICE.

EDWIN F. BROWN, OF CHICAGO, ILLINOIS.

VEHICLE-SPRING.

No. 920,910.  Specification of Letters Patent.  Patented May 11, 1909.

Application filed September 26, 1908. Serial No. 454,933.

*To all whom it may concern:*

Be it known that I, EDWIN F. BROWN, citizen of the United States, residing at Chicago, in the county of Cook and State of Illinois, have invented a certain new and useful Improvement in Vehicle-Springs, of which the following is a full, clear, concise, and exact description, reference being had to the accompanying drawings, forming a part of this specification.

My invention relates to elliptic or semi-elliptic springs employed for supporting vehicle bodies upon running gears, and while the springs of my invention have been particularly devised for use in supporting automobile bodies upon running gears, I do not wish to be limited to this adaptation of the invention.

In practicing my invention, I so construct the springs that lubricant is provided between the adjacent laminæ or leaves thereof, whereby frictional wear of the leaves upon each other is greatly reduced, thereby occasioning many advantages in the operation of the springs. For example, the leaves of the springs by being lubricated, are caused to ride smoothly upon each other, thereby to enable the springs better to cushion the bodies they support to reduce the jars transmitted through the running gears to the bodies. Furthermore, the leaves by being lubricated, do not creak as they ride upon or with respect to each other. It will be obvious to those skilled in the art that my invention may be practiced in a variety of ways and that the invention, therefore, is not to be restricted to any selected embodiment thereof.

In the accompanying drawing, Figure 1 illustrates a side view of a semi-elliptic spring formed in accordance with the invention. Fig. 2 is a plan view showing the construction of some of the laminæ that preferably enter into the formation of the spring. Fig. 3 is a sectional view on line 3 3 of Fig. 2. Fig. 4 is a sectional view on line 4 4 of Fig. 2. Fig. 5 is a plan view showing another form of laminæ that may enter into the spring formation. Fig. 6 illustrates still another form of lamina. Fig. 7 is a sectional view on line 7 7 of Fig. 1.

Like parts are indicated by similar characters of reference throughout the different figures.

The spring, whether full elliptic or semi-elliptic, includes leaves or laminæ $a$ $a$ that may be of usual formation and which may be assembled in a manner well understood by those skilled in the manufacture of such springs, and it will, therefore, be unnecessary for me to detail the specific characteristics of the general construction of the spring illustrated, and though I have selected a semi-elliptic spring for the purpose of illustrating my invention, I do not wish to be limited thereto. The lubricating material is located between adjacent leaves $a$ and is desirably in the form of a heavy oil or lubricating grease. In order that there may be a plentiful supply of this lubricating material, containers therefor are preferably provided between the laminæ, which containers are desirably in the form of additional laminæ $b$ located between the laminæ $a$. While I prefer to employ the laminæ $b$ in addition to the laminæ $a$ and for the purpose of acting as containers for the lubricating material, I do not wish to be limited to the use of supplemental laminæ $b$ in all embodiments of the invention, nor do I desire to be limited in all embodiments of the invention to the interposition of lubricant containers between the main leaves $a$ $a$ of elliptic springs, for I consider it to be broadly new with me to interpose lubricant between the leaves $a$ $a$ in any manner. Where additional laminæ $b$ are employed, they are preferably made of fiber, as said laminæ $b$ may then be made (being porous) to become highly saturated with the lubricant. In order that the laminæ $b$ may hold a considerable quantity of lubricant, said laminæ may be apertured as indicated at $c$ in Figs. 2 to 7, inclusive, these apertures constituting pockets for retaining the lubricant, and from which pockets the lubricant may spread to the faces of the laminæ $b$ that are engaged by the laminæ $a$. If desired, pockets may be interconnected by a series of parallel longitudinal channels $d$ and transverse channels $e$ which extend but partially through the laminæ $b$ as indicated in Figs. 2, 3 and 4, or the channels $d$ may be omitted and replaced by the channels $f$ which serve to connect the channels $e$ and the pockets $c$ in series. Oil may be injected into the pockets $c$ illustrated in Figs. 2 to 6, inclusive, by the provision of openings $g$ at the longitudinal edges and ends of the laminæ $b$, through which openings lubricant may be injected into the pockets $c$ and the channels that connect the same.

It is obvious that changes may readily be made in the device of my invention herein shown and particularly described without departing from the spirit of the invention, but

Having thus described my invention, I claim as new and desire to secure by Letters Patent the following:

1. A spring structure including in its formation superimposed leaves, some of which serve as lubricant containers, said containers having lubricant-receiving pockets, and channels connecting said pockets.

2. A spring structure including in its formation superimposed leaves, some of which serve as lubricant containers, said containers having accessible lubricant-receiving pockets, and channels connecting said pockets.

3. A spring structure including in its formation superimposed leaves, some of which serve as lubricant containers, said containers having lubricant receiving pockets, said spring having channels establishing communication between said pockets and the exterior of the spring.

4. A spring structure including in its formation superimposed leaves, some of which serve as lubricant containers, said containers having lubricant receiving pockets, said spring having channels establishing communication between said pockets and the exterior of the spring, and additional channels establishing communication between said pockets.

5. A spring composed of a plurality of spring leaves; and a member interposed between adjacent leaves, said member being provided with a lubricant.

6. A spring composed of a plurality of superimposed spring leaves; and a pocketed plate interposed between adjacent leaves, the pocketed portion of said plate containing lubricant.

7. A spring composed of a plurality of superimposed spring leaves, the leaves in action having a relative movement; a thin plate disposed between adjacent leaves, said plate being provided with a series of pockets; and a lubricant placed in said pockets.

In witness whereof, I hereunto subscribe my name this 21st day of September A. D. 1908.

EDWIN F. BROWN.

Witnesses:
L. G. STROH,
G. L. CRAGG.